United States Patent Office 2,977,064
Patented Mar. 28, 1961

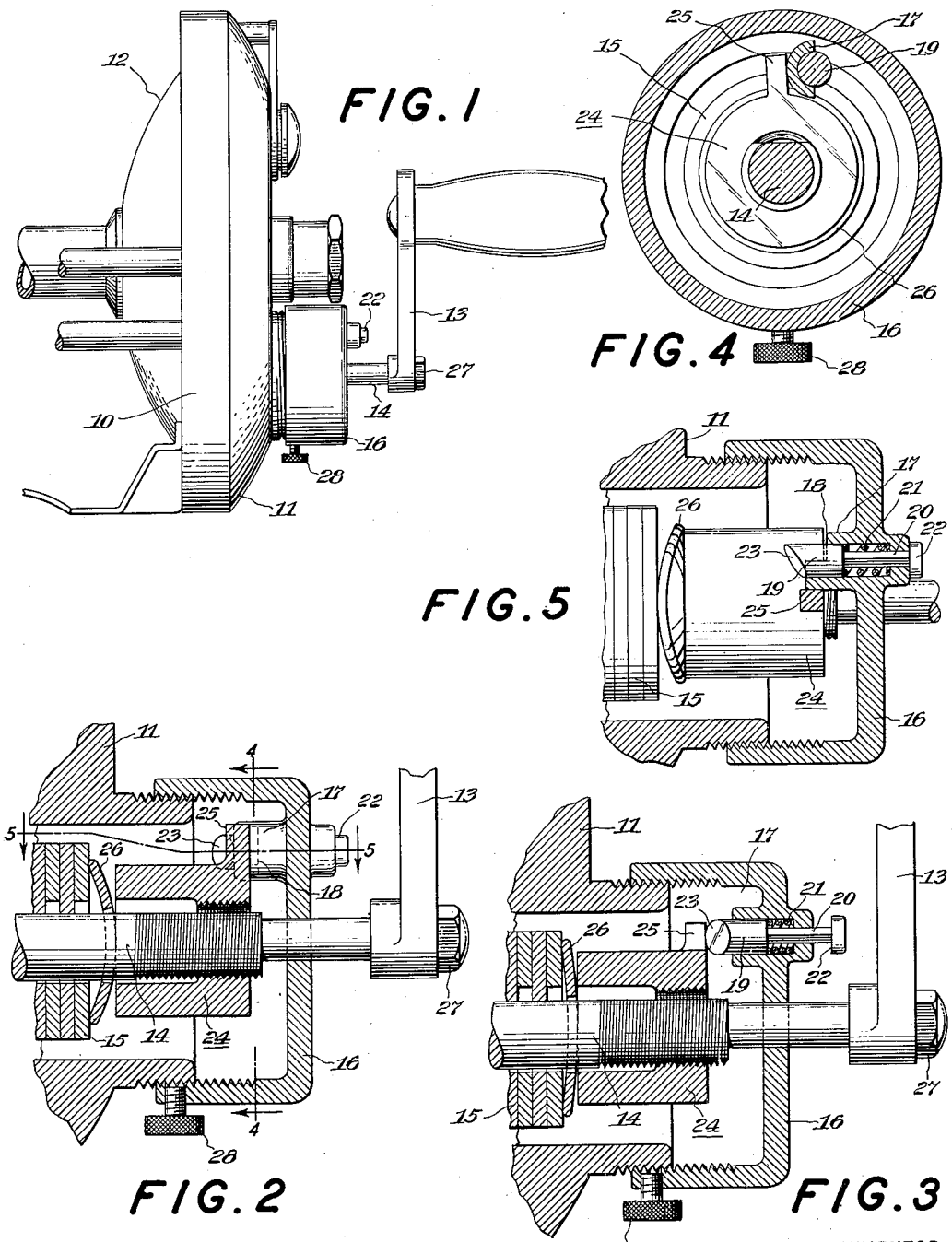

2,977,064
DRAG FOR FISHING REELS

John W. Logan, Jr., Abington, Pa., assignor to True Temper Corporation, a corporation of Ohio Filed Dec. 10, 1957, Ser. No. 701,914

1 Claim. (Cl. 242—84.54)

The present invention relates to new and useful improvements in drags for fishing reels and more specifically to new and useful modifications in the fishing reel drag mechanism of the type wherein the user of the reel may control the amount of drag by movement of the winding handle.

The drag range of a fishing reel drag mechanism of this type was formerly limited to adjustment realized by rotation of the winding handle between predetermined limit positions. With this type of mechanism partial disassembly of the drag mechanism was required to vary the drag range. This in itself may be objectionable in many instances as the fisherman may be confronted with situations where an increase in drag range is immediately essential in order to preclude loss of a fish and equipment. Moreover, even though a resetting of the means for limiting the movement of the handle between the predetermined limit positions was possible by partial disassembly in prior reels of this type it was not always completely adequate as such since the increments by which the drag range could be varied were not precise enough. Inability to make a fine adjustment in range due to structural limitations of the mechanism could prove costly when the fisherman was setting close to the maximum allowable strength of the line.

A quick, exact and convenient means for changing the drag range is necessary to compensate for certain indeterminate fluctuations that take place within the drag mechanism during the course of use. These variations are occasioned by the continual wear of the rough surface of the drag washers, necessitating the application of a greater compressive force on the drag washers from time to time to accomplish the same strength originally set for in the drag. Since amount of attrition of the surface of the drag washers and time at which it takes place are not definitely cognizable, a convenient method for increasing drag range on a moment's notice should be available to the fisherman if the reel is to be as practical as the needs of any situation dictate.

With the foregoing in mind, the principal object of the present invention is to provide a drag mechanism wherein the drag range can be varied any maximum or minimum amount without disassembly of the mechanism.

Another object of the present invention is to provide a novel drag mechanism whose drag can be controlled by rotation of a winding handle between adjustable limit positions.

A further object of the present invention is to furnish a novel drag mechanism which may be manufactured easily and economically and can efficiently and effectively be adapted to presently existing fishing reels.

These and other objects of the present invention and the various features and details of the operation and construction thereof are hereinafter more fully set forth and described with reference to the accompanying drawings in which:

Fig. 1 is a front elevational view of one half of a fishing reel embodying the present invention;

Fig. 2 is an enlarged sectional view of the drag mechanism showing the position of minimum drag on the spool of the reel;

Fig. 3 is an enlarged sectional view similar to Fig. 2 exhibiting the position of maximum drag on the spool of the reel;

Fig. 4 is a sectional view taken along 4—4 of Fig. 2; and

Fig. 5 is a sectional view taken along 5—5 of Fig. 2.

Referring more specifically to the drawings and particularly Fig. 1 thereof, reference numeral 10 designates generally one side of a fishing reel, comprising a side plate 11, a spool 12 and a handle 13 for causing rotation of the spool 12 and also for actuating the drag mechanism. The drag mechanism, which is of conventional construction is illustrated in Fig. 2, and consists of a gear sleeve 14 rotatably journaled in one side plate of the reel which in turn rotatably mounts a gear (not shown) on the inner end thereof. A plurality of drag washers 15 are positioned about the gear sleeve 14 in engagement with one face of the gear and upon the application of pressure on the drag washers 15 in a direction axially inward of the reel, a drag is exerted on the spool. The drive from the gear sleeve 14 to the spool 12 of the reel may be the standard conventional drive such as that shown and described in United States Patent No. 2,922,595, issued January 26, 1960.

In accordance with the present invention a cup-like member 16 threadedly secured to the side plate of the reel is positioned over the outer end of the gear sleeve 14. A ratchet mechanism is mounted radially on the face of the cup extending inwardly toward the side plate of the reel and is adapted to define the limit positions of the drag mechanism. The ratchet mechanism comprises a boss 17 formed integrally in the face of the cup, undercut at its rear surface with respect to the normal direction of rotation of the winding handle as shown at 18 in Fig. 5, and housing a retractable spring loaded pin 19. The pin 19, which has a squared shank 20 to prevent rotary movement with respect to the boss 17, is mounted for axial movement in the boss 17 from an inner position, recessed in the boss to an outer position wherein the pin 19 extends beyond the inner face of the boss and the pin 19 is normally urged to its outer position by means of a compression spring 21. The extension of the front section of the pin beyond the face of the boss 17 is limited by a flange 22 on the outer end of the pin which abuts the boss 17 when the pin 19 is in said outer position. The portion of the pin extending normally inward beyond the face of the boss 17 is chamfered as indicated at 23 to permit actuation of the pin 19 to its inner position upon application of a force from a direction substantially perpendicular to the pin 19.

A collar 24, having a lug 25 formed on its periphery projecting outwardly in the path of the ratchet mechanism, is threadedly connected to the outer end of the gear sleeve 14 in engagement with a spring washer 26 positioned about the gear sleeve 14 intermediate the drag washers 15 and the collar 24. Upon rotation of the handle 13 in a direction to rotate the spool 12, the collar 24 is moved inwardly along the gear sleeve 14 and exerts pressure on the drag washers 15 to thereby apply the desired amount of drag on the spool 12. The interaction of the ratchet mechanism and collar member serves to define the movement of the collar 24 relative to the gear sleeve 14 and limits the amount of drag exerted on the spool 12. As the handle 13, which is connected to the gear sleeve 14 by means of a bolt 27 threadedly received in an opening in the outer end of the gear sleeve 14, is rotated in the clockwise direction relative to Fig. 2 which is also the direction of rotation for winding the spool 12, the collar 24 is rotated with the gear sleeve 14 to a position wherein the lug 25 of the collar 24 engages the boss 17 thereby preventing further rotary movement of the sleeve 24 with the gear sleeve 14. Upon further rotation of the handle 13 and gear sleeve 14, the interference of the lug 25 with the boss 17 causes the collar 24 to move inwardly along the gear sleeve 14 thereby applying pressure on the drag washers and increasing drag on the spool 12, until the lug 25 advances to a position outside the line of the boss 17 (as shown in Fig. 3). The collar 24 then rotates with the gear sleeve 14 as the lug 25 depresses the chamfered spring-loaded pin 19 with each revolution of the handle 13. When the handle 13 is rotated in the counter-clockwise direction, the lug 25 engages the opposite side of the spring-loaded pin 19 causing the collar 24 to move outward along the gear sleeve 14 to reduce the pressure exerted axially inward on the drag washers 15 and decrease drag on the spool 12. Therefore, the collar 24 may be moved outwardly along the gear sleeve 14 until the lug 25 engages the undercut portion 18 of the boss 17, which engagement thereby restricts further outward movement of the collar 24 and thus defines the outermost limit position of said collar 24.

In addition to the novel and useful means for actuating the drag mechanism, another equally important and useful feature of the present invention is the provision of means for regulating the drag range. The latter is accomplished by movement of the cup unit axially with respect to the gear sleeve. Movement of the cup 16 relative to the gear sleeve 14 affects a change in the drag range since the collar 24 which controls the amount of pressure exerted on the drag mechanism moves within newly determined limit positions. Thus in order to increase the drag range, a retaining screw 28 which is located in the threaded wall of the cup 16 is released and the cup 16 advanced by a clockwise rotation. Advancing the cup 16 necessitates an increased travel of the collar 24 along the gear sleeve 14 before the lug 25 disengages the boss 17. Therefore as a result the pressure axially inward is increased by an amount proportionate to the amount the cup 16 is advanced. To decrease the drag range, the cup 16 is threaded outward, away from the housing thereby permitting the collar 24 to be backed off a greater distance with respect to the drag washers 15 before abutting the undercut 18 in the boss 17.

To assemble the drag mechanism of the present invention, the spring washer 26 is positioned about the gear sleeve 14 against the drag washers 15. The collar 24 is then threaded on to the gear sleeve 14 in engagement with the spring washer 26. The cup 16 is threaded on to the side plate 11 and secured at the desired location by means of the screw 28. The winding handle 13 is fastened to the gear sleeve 14 by the bolt 27 to permit winding of the spool 12 and also to actuate the drag mechanism. The handle 13 is then rotated in the clockwise direction, which is the rotation for winding the spool 12, in order to advance the collar 24 along the gear sleeve 14 to the position of maximum drag for the setting which is realized when the lug 25 has moved out of the line of travel of the boss 17. If the drag range at this setting is unsuitable, drag can be increased by releasing the retaining screw 28 and rotating the cup 16 in one direction or the drag may be decreased by rotation in the opposite direction. Upon fastening of the screw 28 the reel is again ready for use.

To use a reel embodying the drag mechanism of the present invention, after a fish is hooked, the handle 13 may be rotated clockwise, for example to the position shown in Fig. 3 in order to reel in the fish. If the drag is insufficient to land the fish, drag can be increased by releasing the retaining screw 28 and advancing the cup 16, thus increasing the distance the collar 24 must move inward upon turning of the handle 13 before the lug 25 formed on the collar 24 disengages the protruding boss 17 thereby increasing the force on the drag washers 15. If, however, while reeling the fish, the fish starts to pull on the line or run, the drag may be decreased as previously described by rotating the handle in a counter-clockwise direction.

From the foregoing it will be apparent that the present invention provides a novel improvement of the drag mechanism for fishing reels wherein the drag on the line may be varied by the user to any maximum or minimum by an increment without disassembly of any part of the reel. In addition it will be apparent that the invention provides a novel improvement on a drag mechanism which is of relatively simplified construction, is easy to use and may be manufactured easily and cheaply.

While a particular embodiment of the present invention has been illustrated and described herein, it is not intended to limit the invention to such a disclosure and changes and modifications may be incorporated and embodied therein within the scope of the following claim.

I claim:

In a fishing reel having a pair of end plates rotatably mounting therebetween a spool with a rotatable gear sleeve drivably connected to the spool operable to cause rotation of the spool and pressure actuated drag mechanism positioned about the gear sleeve operable to exert a drag on the spool upon application of pressure on the drag mechanism in a direction axially inward of the gear sleeve, the improvement comprising; an actuating handle secured to the gear sleeve for rotating said gear sleeve, a collar threaded on the gear sleeve and having one end thereof engageable with the drag mechanism, said collar being axially movable along the gear sleeve between inner and outer limit positions upon actuation of the handle relative to the collar, a cup carried by one of the end plates and positioned about said gear sleeve and collar, a boss formed integrally with the cup and having its terminal end extending inwardly thereof, a spring loaded pin within the boss and normally biased axially toward the collar, a lug projecting from the other end of the collar and operable to engage the boss to preclude rotation of the collar with the gear sleeve whereby when the handle is rotated in a direction to move the collar from its outer limit position toward its inner limit position said collar will move axially inwardly along the gear sleeve to progressively increase the pressure on the drag mechanism until said lug passes the terminal end of said boss, said pin having a bevelled end face engageable with said lug, means adjustably mounting the cup on said one of the end plates for axial movement relative to the collar for adjusting the inner and outer limit positions of said collar, the lug disengaging the terminal end of the boss at the inner limit position and engaging said bevelled end face of said pin to thereby rotate with the gear sleeve, said terminal end of said boss having an undercut portion thereon whereby when the handle is rotated in the opposite direction to move the collar from its inner limit position toward its outer limit position the lug will engage a side of said pin to preclude rotation of the collar with the gear sleeve whereby said collar will move axially along said gear sleeve toward the outer limit position until said lug abuts the undercut portion of said boss.

References Cited in the file of this patent

UNITED STATES PATENTS

| | | |
|---|---|---|
| 865,613 | Schreidt | Sept. 10, 1907 |
| 1,981,429 | Scott | Nov. 20, 1934 |
| 1,987,713 | Scott | Jan. 15, 1935 |
| 2,745,607 | Taggart et al. | May 15, 1956 |
| 2,760,736 | Mihalko et al. | Aug. 28, 1956 |